US007578595B2

(12) United States Patent
Miwa et al.

(10) Patent No.: US 7,578,595 B2
(45) Date of Patent: Aug. 25, 2009

(54) PROJECTION TYPE VIDEO DISPLAY APPARATUS

(75) Inventors: Takashi Miwa, Osaka (JP); Takashi Ikeda, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 122 days.

(21) Appl. No.: 11/248,607

(22) Filed: Oct. 13, 2005

(65) Prior Publication Data

US 2006/0082732 A1 Apr. 20, 2006

(30) Foreign Application Priority Data

Oct. 15, 2004 (JP) ............................. 2004-300878
Jun. 17, 2005 (JP) ............................. 2005-178651

(51) Int. Cl.
*G03B 21/18* (2006.01)
*G03B 21/26* (2006.01)
*H04N 5/74* (2006.01)
*G02F 1/00* (2006.01)
*F21V 29/00* (2006.01)

(52) U.S. Cl. ............................. 353/54; 353/57; 353/60; 353/61; 348/748; 362/264; 362/294

(58) Field of Classification Search .................. 353/54, 353/52, 56, 57, 58, 60, 61; 348/748; 349/161; 362/580, 547, 218, 264, 294, 345, 373
See application file for complete search history.

(56) References Cited

U.S. PATENT DOCUMENTS

2004/0257538 A1* 12/2004 Kondo et al. .................. 353/54

2005/0157269 A1* 7/2005 Seto et al. ..................... 353/61
2005/0201107 A1* 9/2005 Seki ........................... 362/373

FOREIGN PATENT DOCUMENTS

| CN | 1867863 A | 11/2006 |
|---|---|---|
| JP | 04-069641 | 3/1992 |
| JP | 2001-222065 | 8/2001 |

OTHER PUBLICATIONS

Office Action issued on Aug. 15, 2008 in corresponding Chinese Patent Application No. 2005101136372.

* cited by examiner

*Primary Examiner*—Rochelle-Ann Blackman
(74) *Attorney, Agent, or Firm*—Westerman, Hattori, Daniels & Adrian, LLP.

(57) ABSTRACT

There is provided a heat conductive portion for conducting heat generated by an LED light source to cooling liquid at a rear side of each LED light source. Each heat conductive portion is connected one another with a pipe, and the cooling liquid flowing in the pipe is sequentially circulated through each heat conductive portion. A heat generation amount of an LED light source for red light is the smallest, the heat generation amount of an LED light source for green light is the largest, and the heat generation amount of an LED light source for blue light is the middle of the two. The cooling liquid cooled by passing through a radiation fin is firstly supplied to the heat conductive portion for the LED light source for red light, secondly supplied to the heat conductive portion for the LED light source for blue light, and lastly supplied to the heat conductive portion for the LED light source for green light. The cooling liquid discharged from a pump is supplied to the heat conductive portion for the heat conductive portion for the LED light source for green light. Then, the cooling liquid from this heat conductive portion passes through the pipe to be supplied to the radiation fin (radiator).

37 Claims, 7 Drawing Sheets

PROJECTION TYPE VIDEO DISPLAY APPARATUS

BACKGROUND OF THE INVENTION

Field of the Invention

The present invention relates to a projection type video display apparatus such as a liquid crystal projector, and the like. Because of a configuration in which light emitted from a light source is modulated by a light valve such as a liquid crystal panel, etc., and the modulated light is projected, a projection type video display apparatus needs to be provided with a high-intensity light source. For this, it is needed to prepare measures against heat generated from the high-intensity light source. Conventionally, the light source is cooled by blowing cooling air generated by a fan to the light source, and air in the apparatus, of which temperature has risen, is exhausted outside the apparatus (Japanese Patent Laying-open No. 2001-222065).

SUMMARY OF THE INVENTION

However, in the above-described prior art, air flow generated by the fan is exhausted by passing through various optical parts in the apparatus, so that there may be a case where the light source, and the like, cannot be sufficiently cooled depending on how the air flows (flow passage). That is, cooling capacity is affected by an arrangement of the optical parts. Furthermore, heat is likely to remain in the apparatus due to the air of which temperature has risen in the apparatus, which may cause a disadvantage such as a decrease in durability of optical parts and circuit parts by the heat.

In view of the foregoing circumstances, it is an object of the present invention to provide a projection type video display apparatus having high cooling capacity.

In order to solve the above problem, a projection type video display apparatus of the present invention comprises a light source, a heat conductive portion for conducting heat generated by the light source to cooling liquid, the heat conductive portion being provided in the vicinity of the light source, a pipe for circulating the cooling liquid through the heat conductive portion, a pump connected to the pipe, and a radiation portion connected to the pipe.

With the above-described configuration, the cooling liquid draws heat generated by the light source by passing through the heat conductive portion. The cooling liquid of which temperature has risen by drawing the heat is guided to the radiation portion, and heat of the cooling liquid is radiated. The cooling liquid cooled by this heat radiation is returned to the pipe again and reaches the heat conductive portion. Thus, a circulation path is formed such that the cooling liquid circulates through from the heat conductive portion to the radiation portion, and then, to the heat conductive portion. Unlike a cooling by a fan, cooling capacity is not affected by an arrangement of optical parts in the apparatus. Furthermore, the cooling liquid is circulated as described above, so that cooled cooling liquid is always supplied to the heat conductive portion. As a result, a decrease in cooling capacity is prevented.

In such a projection type video display apparatus of the above-described configuration, it is preferable that the radiation portion is provided in an outside area partitioned off from an arrangement space of the light source. With such the configuration, the cooling liquid of which temperature has risen by passing through the heat conductive portion is guided to the radiation portion provided in the outside area, and heat of the cooling liquid is radiated in the outside area, so that a temperature rise in the apparatus is restrained as much as possible. Accordingly, the temperature rise in the apparatus is prevented, which makes it possible to avoid a decrease in durability of the optical parts.

In the projection type video display apparatus of such the configurations, it is preferable to comprise a wind generator for generating wind to cool the radiation portion. With such the configuration, radiation efficiency of the radiation portion is improved. Moreover, in the above-described configuration in which the radiation portion is provided in the outside area partitioned off from the arrangement space of the light source, it is preferable that a wind generator for generating wind to cool the radiation portion is provided, and this wind generator draws in an air inside the apparatus and exhausts the air to the outside area. With such the configuration, it is possible to exhaust the warmed air inside the apparatus as well as to cool the above-described radiation portion.

In the projection type video display apparatus of such the configurations, it is preferable that at least one of the pipe and the heat conductive portion is covered with a heat-insulating material.

In the projection type video display apparatus of such the configurations, the light source may be composed of a solid light-emitting element.

The configurations described above is referred to as a liquid-cooling basic configuration in this section.

In the above-described liquid-cooling basic configuration, the projection type video display apparatus comprises a plurality of the light sources and the heat conductive portion in each of the light sources, in which the cooling liquid is sequentially circulated through a plurality of the heat conductive portions. (hereinafter, referred to as a first plural light sources configuration in this section).

In the above-described first plural light sources configuration, the plurality of the light sources may be arranged in an approximate U-shape. Or, the plurality of the light sources may be arranged in a same one plane surface.

In the first plural light sources configuration and a configuration according thereto, it may be configured that heat generation amounts of the plurality of the light sources are different, and the cooling liquid cooled by passing through the radiation portion is firstly supplied to the heat conductive portion for the light source of which heat generation amount is the smallest (hereinafter, referred to as a first configuration in this section). In this first configuration, the cooling liquid cooled by passing through the radiation portion may be sequentially circulated through each of the heat conductive portions according to an ascending order of the heat generation amount of the light sources (hereinafter, referred to as a second configuration in this section).

Furthermore, in the first configuration, the plurality of the light sources are a red light source for emitting light in red, a green light source for emitting light in green, and a blue light source for emitting light in blue, and the cooling liquid cooled by passing through the radiation portion may be firstly supplied to the heat conductive portion for the red light source. Moreover, in the second configuration, the plurality of the light sources are a red light source for emitting light in red, a green light source for emitting light in green, and a blue light source for emitting light in blue, and the cooling liquid cooled by passing through the radiation portion may be firstly supplied to the heat conductive portion for the red light source, secondly supplied to the heat conductive portion for the blue light source, and lastly supplied to the heat conductive portion for the green light source.

In the first configuration, second configuration, and a configuration according thereto, the heat conductive portion to receive the cooling liquid lastly may be positioned in the vicinity of the radiation portion.

In the first plural light sources configuration and the configuration according thereto, degrees of deterioration by heat are different in the plurality of the light sources, and the cooling liquid cooled by passing through the radiation portion is firstly supplied to the heat conductive portion for the light source of which degree of deterioration by heat is the greatest (hereinafter, referred to as a third configuration in this section). Furthermore, in the third configuration, the cooling liquid cooled by passing through the radiation portion is circulated through each of the heat conductive portions according to a descending order of the deterioration by heat in the light sources (hereinafter, referred to as a fourth configuration in this section).

In the third configuration, the plurality of the light sources are a red light source for emitting light in red, a green light source for emitting light in green, and a blue light source for emitting light in blue, and the cooling liquid cooled by passing through the radiation portion may be firstly supplied to the heat conductive portion for the red light source. Furthermore, in the fourth configuration, the plurality of the light sources are a red light source for emitting light in red, a green light source for emitting light in green, and a blue light source for emitting light in blue, and the cooling liquid cooled by passing through the radiation portion may be firstly supplied to the heat conductive portion for the red light source, secondly supplied to the heat conductive portion for the green light source, and lastly supplied to the heat conductive portion for the blue light source.

In the third configuration, the fourth configuration, and the configuration according thereto, the heat conductive portion to receive the cooling liquid lastly may be positioned in the vicinity of the radiation portion. Or, in the third configuration, the fourth configuration, and the configuration according thereto, the heat conductive portion to receive the cooling liquid firstly may be positioned in the vicinity of the radiation portion.

In the liquid-cooling basic configuration, the projection type video display apparatus comprises a temperature sensor for detecting a temperature of the light source, in which, in a case where the temperature detected by the temperature sensor is equal to or higher than a certain temperature, supply of the cooling liquid in a prescribed flow volume may be started (including both cases in which the supply in the prescribed flow volume is started from a state where a supply amount is 0 (zero), and in which the supply in the prescribed volume is started from a supply state where the supply amount is less than the prescribed volume, hereinafter same as above).

In the first configuration and the second configuration, the projection type video display apparatus comprises one or a plurality of temperature sensors for detecting a temperature of one or several light sources out of the plurality of the light sources, in which, in a case where one or all of the several temperatures detected by the one or the plurality of temperature sensors are equal to or higher than a certain temperature, supply of the cooling liquid in a prescribed flow volume may be started.

In the third configuration and the fourth configuration, the projection type video display apparatus comprises a temperature sensor for detecting a temperature of the light source of which degree of deterioration by heat is the greatest out of the plurality of the light sources, in which, in a case where the temperature detected by the temperature sensor is equal to or higher than a certain temperature, supply of the cooling liquid in a prescribed flow volume may be started.

In the liquid-cooling configuration, the projection type video display apparatus comprises a plurality of the light sources and the heat conductive portion in each of the light sources, in which the cooling liquid is sequentially circulated through a plurality of the heat conductive portions in parallel (hereinafter, referred to as a second plural light sources configuration in this section).

In the second plural light sources configuration, the plurality of the light sources may be arranged in an approximate U-shape. Or, in the second plural light sources configuration, the plurality of the light sources are arranged in a same one plane surface.

In the second plural light sources configuration and the configuration according thereto, heat generation amounts of the plurality of the light sources are different, and the cooling liquid cooled by passing through the radiation portion may be supplied most to the heat conductive portion for the light source of which heat generation amount is the largest (hereinafter, referred to as a fifth configuration in this section). In the fifth configuration, the cooling liquid cooled by passing through the radiation portion may be supplied more to the heat conductive portion for the light source of which heat generation amount is larger (hereinafter, referred to as a sixth configuration in this section).

In the fifth configuration, the plurality of the light sources are a red light source for emitting light in red, a green light source for emitting light in green, and a blue light source for emitting light in blue, and the cooling liquid cooled by passing through the radiation portion is supplied most to the heat conductive portion for the green light source. In the sixth configuration, the plurality of the light sources are a red light source for emitting light in red, a green light source for emitting light in green, and a blue light source for emitting light in blue, and a supply amount of the cooling liquid cooled by passing through the radiation portion may be in a descending order of the heat conductive portion for the green light source, the heat conductive portion for the blue light source, and the heat conductive portion for the red light source.

In the second plural light sources configuration and the configuration according thereto, degrees of deterioration by heat are different in the plurality of the light sources, and the cooling liquid cooled by passing through the radiation portion may be supplied most to the heat conductive portion for the light source of which degree of deterioration by heat is the greatest (hereinafter, referred to as a seventh configuration in this section). In the seventh configuration, the cooling liquid cooled by passing through the radiation portion is supplied more to the heat conductive portion for the light source of which degree of deterioration by heat is greater (hereinafter, referred to as an eighth configuration in this section).

In the seventh configuration, the plurality of the light sources are a red light source for emitting light in red, a green light source for emitting light in green, and a blue light source for emitting light in blue, and the cooling liquid cooled by passing through the radiation portion may be supplied most to the heat conductive portion for the red light source. In the eighth configuration, the plurality of the light sources are a red light source for emitting light in red, a green light source for emitting light in green, and a blue light source for emitting light in blue, and a supply amount of the cooling liquid cooled by passing through the radiation portion may be in a descending order of the heat conductive portion for the red light source, the heat conductive portion for the blue light source, and the heat conductive portion for the green light source.

In the second plural light sources configuration, the projection type video display apparatus comprises one or a plurality of temperature sensors for detecting a temperature of one or several light sources out of the plurality of the light sources, in which, in a case where one or all of the several temperatures detected by the one or the plurality of temperature sensors are equal to or higher than a certain temperature, supply of the cooling liquid in a prescribed flow volume is started.

In the second plural light sources configuration, the projection type video display apparatus comprises a temperature sensor for detecting a temperature of each light source, in which, in a case where the temperature of each light source detected by the temperature sensor is equal to or higher than a certain temperature, supply of the cooling liquid to each light source in a prescribed flow volume is started individually.

A projection type video display apparatus according to these configurations may include a heat conductive portion for a member, the heat conductive portion for a member conducting to the cooling liquid heat generated by the member which generates heat by energization thereto, in which the pipe is connected also to the heat conductive portion for the member. A projection type video display apparatus according to these configurations may include a heat conductive portion for an optical part, the heat conductive portion for an optical part conducting to the cooling liquid heat generated by the optical part which generates heat by receiving light emitted from the light source, in which the pipe is connected also to the heat conductive portion for an optical part.

According to the present invention, it is possible to demonstrate exquisite cooling capacity without being affected by the arrangement of the optical parts. Moreover, there is an advantage such that the increase in temperature in the apparatus is eliminated as much as possible and the decrease in durability of the optical parts can be avoided by preventing the increase in the temperature in the apparatus.

The foregoing and other objects, features, aspects and advantages of the present invention will become more apparent from the following detailed description of the present invention when taken in conjunction with the accompanying drawings

DESCRIPTION OF THE PREFERRED EMBODIMENTS

First Embodiment

Hereinafter, a projection type video display apparatus according to a first embodiment of the present invention will be described with reference to FIG. 1 and FIG. 2.

Figure 1:
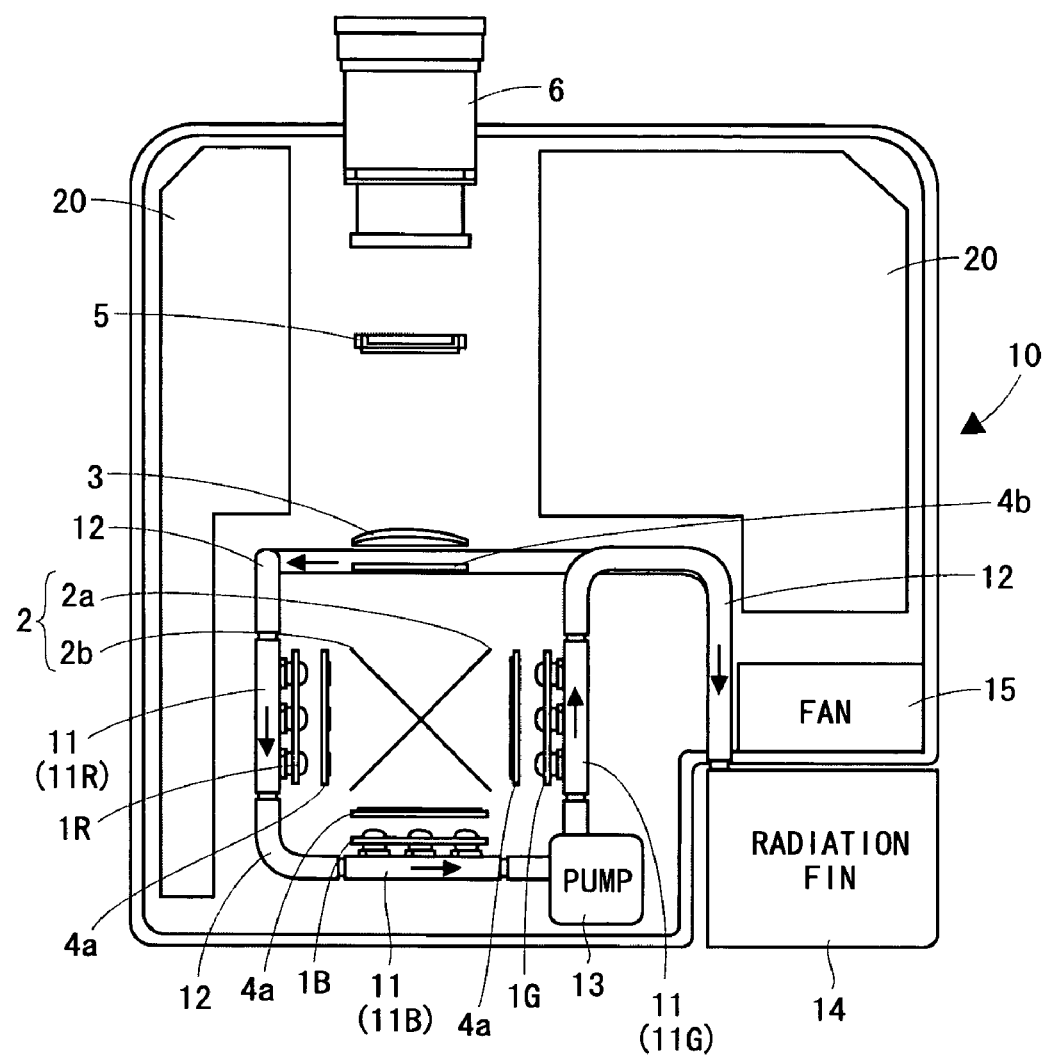
FIG. 1 is a plan view showing a projection type video display apparatus of a first embodiment of the present invention.
Figure 2:
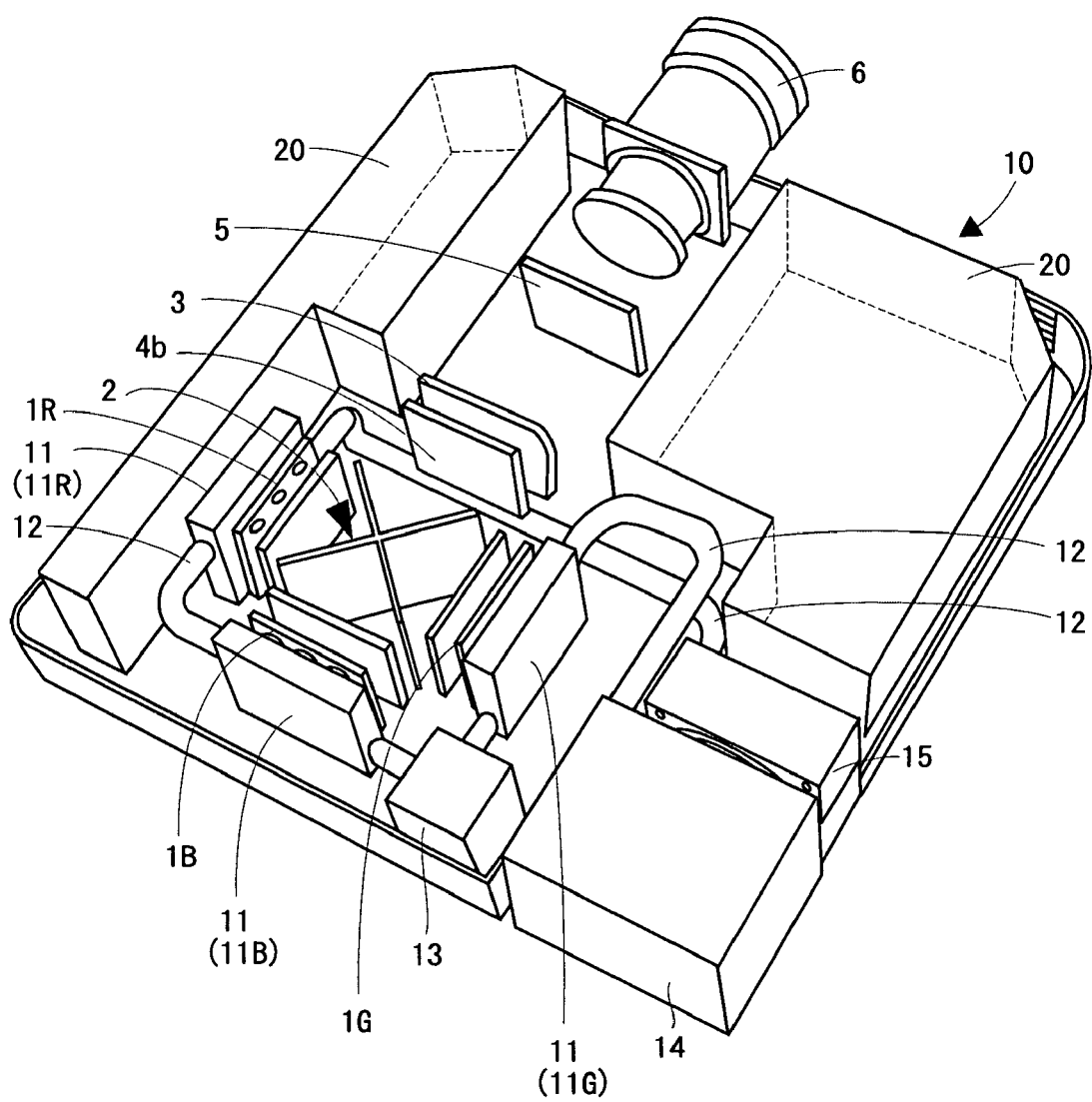
FIG. 2 is a perspective view showing the projection type video display apparatus of the first embodiment of the present invention.

FIG. 1 is a plan view showing a single-panel projection type video display apparatus 10, and FIG. 2 is a perspective view of the projection type video display apparatus 10. The projection type video display apparatus 10 is provided with LED light sources 1R, 1G, 1B as three light sources (hereinafter, numeral "1" is used for generally referring to the LED light source). Each LED light source 1 has structure in which LEDs (Light-emitting diodes) are arranged in an array shape. The LED light source 1R emits light in red, the LED light source 1G emits light in green, and the LED light source 1B emits light in blue.

The LED light source 1B is arranged in such a manner as to face a light-incidence surface of a lens 3 with sandwiching a cross dichroic mirror 2, and the LED light source 1R and the LED light source 1G are arranged in such a manner as to face each other with sandwiching the cross dichroic mirror 2 therebetween. That is, the three LED light sources 1 are arranged in an approximate U-shape (a quasi-square shape in which one of four sides is missing).

Light emitted from each LED light source 1 is guided to the light-incidence side of the lens 3 by the cross dichroic mirror 2. The cross dichroic mirror 2 includes a first cross dichroic mirror portion 2a and a second cross dichroic mirror portion 2b in a cross arrangement. The first cross dichroic mirror portion 2a reflects the light in red and transmits light in other colors. The second cross dichroic mirror portion 2b reflects the light in green and transmits light in other colors.

On a light-emission side of each LED light source 1, there is provided a first fly's eye lens 4a for optically integrating emitted light and guiding the integrated light to a liquid crystal display panel 5. Moreover, a second fly's eye lens 4b is arranged on a light-exit side of the cross dichroic mirror 2 (the light-incidence side of the lens 3). An integrator lens for each light source is formed of the first fly's eye lens 4a and the second fly's eye lens 4b. That is, each lens pair of the fly's eye lenses 4a, 4b guides light emitted from the LED light source 1 to an entire surface of liquid crystal display panel 5.

The liquid crystal display panel 5 has structure with a RGB color filter or structure without the RGB color filter. In a case where the liquid crystal display panel 5 having the structure with the RGB color filter is used, all the LED light sources 1R, 1G, and 1B are lighted at the same time, and light in white is guided to the liquid crystal display panel 5. In a case where the liquid crystal display panel 5 having the structure without the RGB color filter is used, the LED light sources 1R, 1G, and 1B are lighted in a time-sequential manner, and the liquid crystal display panel 5 is driven using the video signal of respective colors in synchronous with timing of the lighting.

Light modulated by passing through the liquid crystal display panel 5 (full-color image light) is projected by a projection lens 6 and displayed on a screen not shown.

A heat conductive portion 11 that conducts the heat generated by the LED light source 1 to cooling liquid is provided at a rear side of each LED light source 1. It is noted that, hereinafter, there are some cases where the heat conductive portion for the LED light source 1R is referred to as a heat conductive portion 11R, the heat conductive portion for the LED light source 1B is referred to as a heat conductive portion 11B, and the heat conductive portion for the LED light source 1G is referred to as a heat conductive portion 11G. Each heat conductive portion 11 is coupled by a pipe 12, and cooling liquid flowing inside the pipe 12 sequentially circulates through each of the heat conductive portions 11. The pipe 12 and each heat conductive portion 11 may be covered with a heat-insulating material.

In this embodiment, the LED light source 1R emits the least amount of heat, and the LED light source 1G emits the largest amount of heat, and the LED light source 1B emits an intermediate amount of heat between the two. In this embodiment, the cooling liquid cooled by passing through a radiation fin (radiator) 14, which is a heat exchanging portion, is firstly supplied to the heat conductive portion 11R for the LED light source 1R, then supplied to the heat conductive portion 11B, and lastly supplied to the heat conductive portion 11G The pipe 12 for supplying the cooling liquid from the radiation fin 14 to the heat conductive portion 11R passes through the light-exit side of the cross dichroic mirror 2. This pipe 12 is arranged on a bottom surface not to disturb the passage of light. A pump 13 for circulating the cooling liquid is arranged between the heat conductive portion 11B and the heat conductive portion 11G. The cooling liquid discharged from the pump 13 is supplied to the heat conductive portion 11G. Then, the cooling liquid which exits from the heat conductive portion 11G is supplied, via the pipe 12, to the radiation fin 14. It is noted that the arrangement position of the pump 13 is not limited to a position between the heat conductive portion 11B and the heat conductive portion 11G, but the pump 13 may be arranged in any position on the pipe.

The radiation fin 14 is provided in an outside area (in this embodiment, the outside area is formed in the vicinity of the heat conductive portion 11G) partitioned off from an arrangement space of the LED light source 1 (inside a case where the optical system and a circuit portion 20, etc., are arranged). When a case cover not shown is attached on the case, the radiation fin 14 may be exposed outside from the case cover or arranged in the case cover to prevent a user's hand from touching the fin. In a case where the radiation fin 14 is arranged in the case cover, an aperture is provided on the cover.

A wind fan 15 is provided in the case. The wind fan 15 draws in the air inside the case and exhausts the air to the outside area. This exhausted air effectively draws heat from the cooling liquid in the radiation fin 14, and the heat is exhausted outside the case.

As described above, a circulation path of the cooling liquid is formed, that is, the cooling liquid, which has passed through the heat conductive portion 11, and of which temperature has risen by drawing heat from the LED light source 1, is guided to the radiation fin 14 and heat of the cooling liquid is radiated, then, the cooling liquid cooled by the radiation is returned to the pipe 12 again and reaches the heat conductive portion 11. Unlike air-cooling by a fan, cooling capacity is not affected by the arrangement of optical parts in the case. Moreover, the cooling liquid is circulated as described above, so that the cooled cooling liquid is always supplied to the heat conductive portions 11 and a decrease in cooling capacity is prevented.

Furthermore, in this embodiment, the cooling liquid of which temperature has risen by circulating the heat conductive portions 11 is guided to the radiation fin 14 provided on the outside area, and the heat of the cooling liquid is radiated in the outside area. Therefore, a temperature rise of the air inside the case can be restrained as much as possible, and a decrease in durability of the optical parts can be avoided by preventing the temperature rise inside the case. In addition, the outside area is not necessarily separated completely from the area inside the case, but may be an area, even if the area is inside the case, partitioned off to some extent from a space inside the case and opened to outside. A configuration in which an exhaust duct is provided in the case and the radiation fin 14 is provided in the exhaust duct is equivalent to the configuration in which the radiation fin is provided in the outside area.

Furthermore, in this embodiment, the heat generation amount of a plurality of LED light sources 1 are different from one another, and the cooling liquid cooled by passing through the radiation fin 14 is circulated sequentially from the heat conductive portion 11 for the LED light source 1 of which heat generation amount is smaller. Therefore, a length of flow passage of the high temperature cooling liquid can be shortened, so that there is an advantage in preventing the temperature rise inside the case. Furthermore, in this embodiment, the outside area is located in the vicinity of the heat conductive portion 11G to receive the cooling liquid lastly, so that the flow passage of the cooling liquid having the highest temperature is minimized, so that there is a further advantage in preventing the temperature rise inside the case.

Furthermore, in this embodiment, the wind fan 15 exhausts air from inside the case to the outside area, which provides an advantage such that both exhaust of the air inside the case and cooling of the radiation fin 14 can be performed. Needless to say, a configuration in which the air outside the case is taken in to be blown to the radiation fin 14 is not excluded.

It is noted that, the pipe 12 may be arranged using an area above the cross dichroic mirror 2, and other areas, and the pipe 12 may be arranged in any manner unless the optical path is blocked. Furthermore, in the above-described embodiment, the light source is composed of a solid light-emitting element, however this is not always the case. Also the arrangement order of the LED light sources 1 for emitting light of respective colors and the circulation order of the cooling liquid are not limited to the above-described configuration. Moreover, though a plurality of light sources are provided, the liquid-cooling structure of the present invention can be adopted to a configuration in which a single light source (a light source composed of a white LED, for example) is provided. Moreover, though a configuration in which a single liquid crystal display panel is provided is shown, a three-panel configuration (a configuration in which liquid crystal display panels are arranged between each of the LED light sources 1 and the cross dichroic mirror 2, for example) may be adopted. Furthermore, instead of a transmission-type liquid crystal display panel, a reflection type liquid crystal display panel may be adopted. Alternatively, a video display panel on which a great number of micro mirrors are arranged, and the like, may be adopted. Those are similar to the following embodiments.

Second Embodiment

Figure 3:
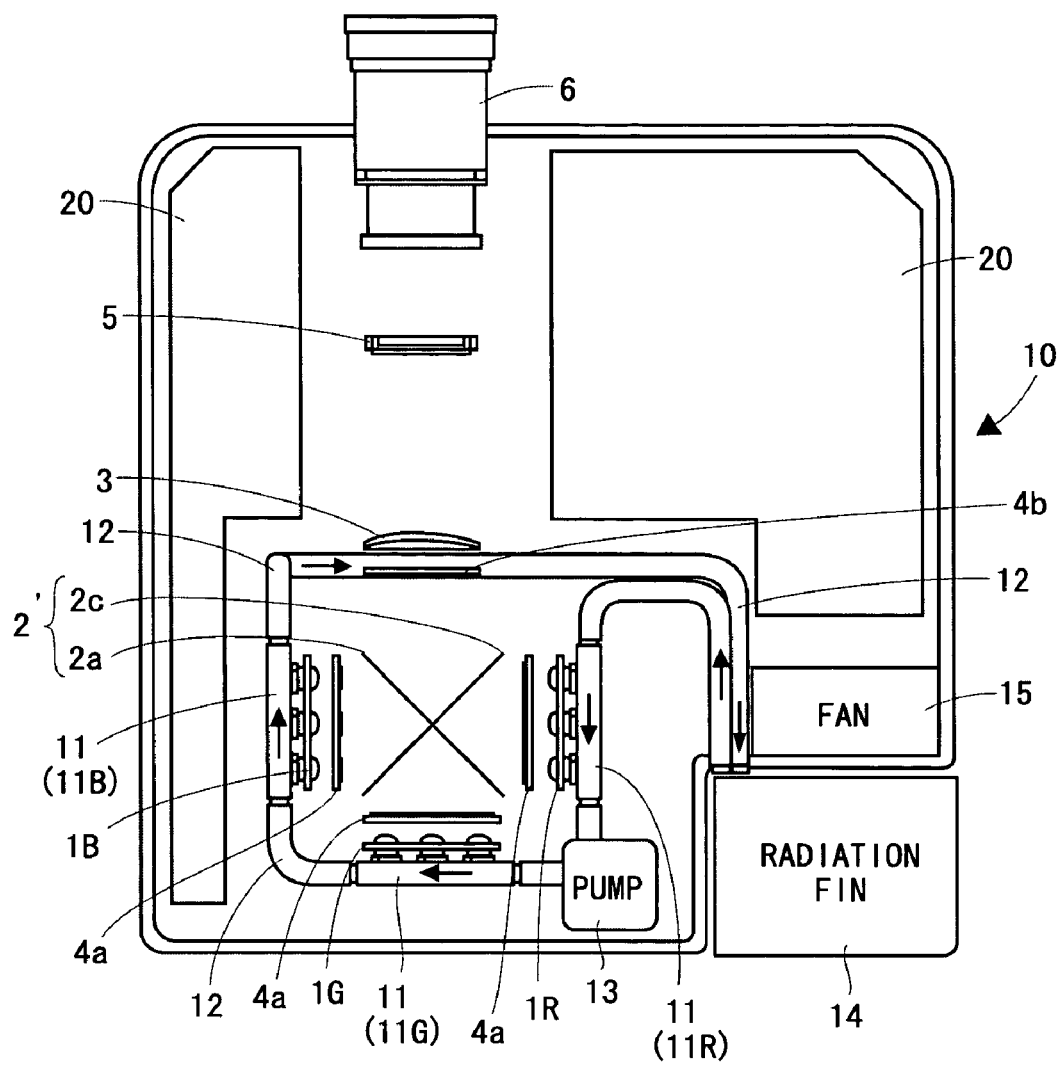
FIG. 3 is a plan view showing a projection type video display apparatus of a second embodiment of the present invention.

The second embodiment of the present invention will be described with reference to FIG. 3. It is noted that the same numerals are added to the same members as those shown in FIG. 1, and descriptions thereof are omitted. A cross dichroic mirror 2' is provided with a first dichroic mirror portion 2a and a second cross dichroic mirror portion 2c in the cross arrangement. The first cross dichroic mirror portion 2a reflects light in red and transmits light in other colors. The second cross dichroic mirror portion 2c reflects light in blue and transmits light in other colors. In this embodiment, degrees of deterioration by heat in a plurality of LED light sources 1 (degradation in display performance such as luminance degradation, wavelength shift, a chromaticity change caused by a change of half bandwidth, etc.) are different one another, and the degree of deterioration by heat in the LED light source 1R for emitting light in red is the greatest. The cooling liquid is allowed to flow in a reverse direction of that shown in FIG. 1. Then, in the vicinity of the radiation fin 14, the LED light source 1R and the heat conductive portion 11R are provided. The cooling liquid cooled by passing through the radiation fin 14 is firstly supplied to the heat conductive portion 11R for the LED light source 1R. That is, the cooling liquid in a lowest-temperature state is supplied to the LED 1R of which degree of the deterioration by heat is the greatest, so that a temperature rise in the LED light source 1R is restrained and the deterioration is prevented. It is noted that, in this embodiment, the cooling liquid which passes through the heat conductive portion 11R for the LED light source 1R is supplied to the heat conductive portion 11, and then, lastly supplied to the heat conductive portion 11B. It is preferable that the cooling liquid is sequentially circulated through each of the heat conductive portions according to a descending order of the degree of deterioration by heat in the light sources.

Also in the first embodiment described above, the cooling liquid cooled by passing through the radiation fin 14 is firstly supplied to the heat conductive portion 11R for the LED light source 1R. Therefore, also in the first embodiment 1, the cooling liquid in the lowest-temperature state is supplied to the LED 1R of which degree of the deterioration by heat is the greatest, so that temperature rise in the LED light source 1R is restrained and the deterioration is prevented. However, in the configuration of the second embodiment, the LED light source 1R is arranged in the vicinity of the radiation fin 14. Therefore, the pipe 12 extending from the radiation fin 14 to the heat conductive portion 11R for the LED light source 1R may have shorter length, and a temperature rise of the cooling liquid before the cooling liquid being supplied to the heat conductive portion 11R can be restrained as much as possible.

Third Embodiment

Figure 4:
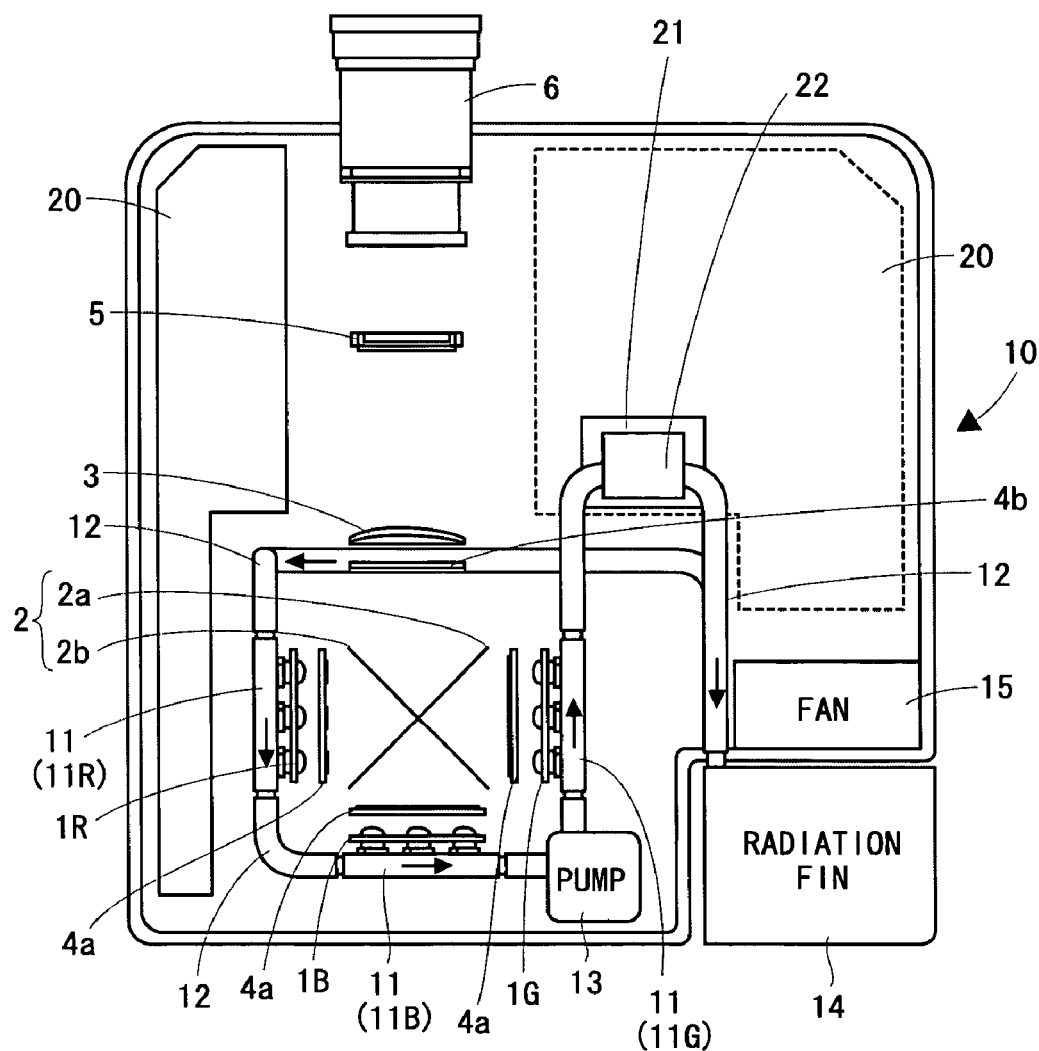
FIG. 4 is a plan view showing a projection type video display apparatus of a third embodiment of the present invention.

The third embodiment of the present invention will be described with reference to FIG. 4. It is noted that the same numerals are added to the same members as those shown in FIG. 1, and descriptions thereof are omitted. In the configuration shown in FIG. 1, the cooling liquid which passes through the heat conductive portion 11G for the LED light source 1G is to be guided to the radiation fin 14. On the other hand, in the configuration shown in FIG. 4, the cooling liquid which passes through the heat conductive portion 11G for the LED light source 1G is, via a heat conductive portion 22 for power source, guided to the radiation fin 14. The heat conductive portion 22 for power source is provided to draw heat generated by a power source 21 arranged in a circuit portion 20. Such the configuration makes it possible to exhaust also the heat generated by the power source 21 outside the case and to restrain the temperature rise in the case. Furthermore, it is possible to adopt a configuration in which a heat conductive portion (not shown) is also provided for an optical part (the liquid crystal display panel 5, and the like, for example) and the cooling liquid is supplied to the heat conductive portion. As the heat conductive portion provided for the optical part, the part having a frame shape is used for example, so as not to block an optical path.

Fourth Embodiment

The fourth embodiment of the present invention will be described with reference to FIG. 5 and FIG. 6.

Figure 5:
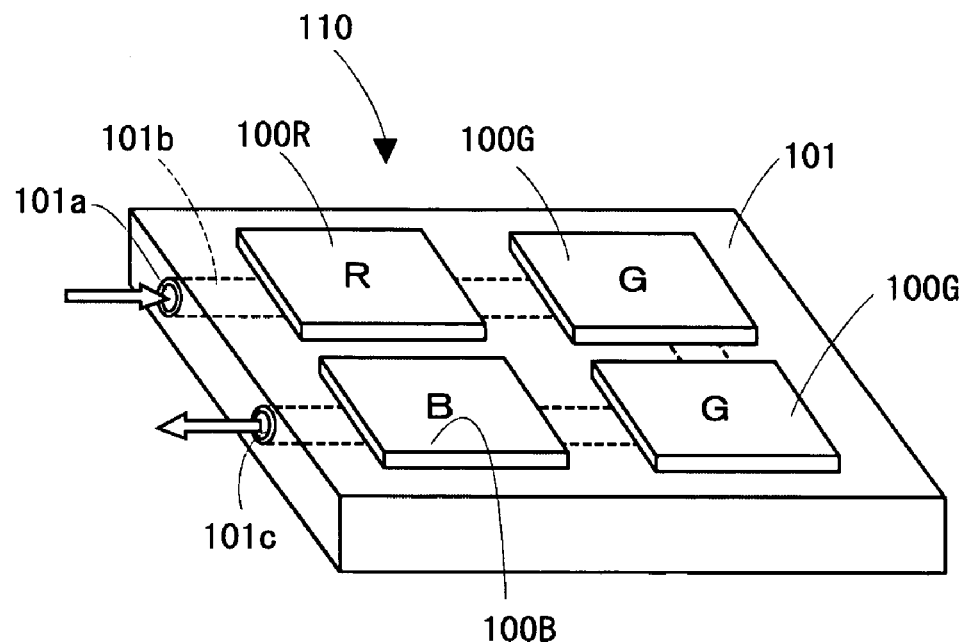
FIG. 5 is a view showing a fourth embodiment of the present invention, and is a perspective view showing a white light illuminating device.

FIG. 5 is a perspective view showing a white light illuminating device 110 used in a projection type video display apparatus. As the projection type video display apparatus in this case, a configuration in which white light is separated into light of respective colors by a dichroic mirror, etc., the light of respective colors are guided to video display panels for light of respective colors, and image light of respective colors are composed and projected, or a configuration in which white light is guided to a single full-color video display panel, is adopted. The white light illuminating device 110 is formed such that a plurality of light sources are arranged in the same one plane surface. Specifically, the LED light source 100R for emitting light in red, the LED light sources 100G, 100G for emitting light in green, and the LED light source 100B for emitting light in blue are arranged on a heat conductive plate 101 in a square shape. Each LED light source 100 may be the LED light source formed of one LED, or the LED light source formed of a plurality of LEDs.

An inlet portion 101a for the cooling liquid, a passage portion 101b having an approximate U-shape, and an outlet portion 101c are formed on the heat conductive plate 101. The LED light source 100R is firstly arranged on an upstream side of the passage portion 101b, the LED light sources 100G, 100G are arranged on a downstream side of the passage portion, and the LED light source 1B is arranged on a further downstream side of the passage portion. The heat conductive plate 101 can be regarded as to be formed by integrating a plurality of heat conductive portions for respective light sources.

Degrees of deterioration by heat in the respective LED light sources 100 are different, and the degree of deterioration by heat is the greatest in the LED light source 100R for emitting light in red. The cooling liquid cooled by passing through the radiation fin 14 not shown firstly passes under the LED light source 100R. That is, the cooling liquid in the lowest-temperature state is supplied to the LED 1R of which degree of the deterioration by heat is the greatest, so that the temperature rise in the LED light source 100R is restrained and the deterioration by heat is prevented. It is noted that, in this configuration, the cooling liquid which has passed under the LED light source 100R passes under the LED light sources 100G, 100G, and lastly passes under the LED light source 100B. It is preferable that the cooling liquid is sequentially circulated through each of the heat conductive portions according to a descending order of the degree of deterioration by heat in the light sources.

Figure 6:
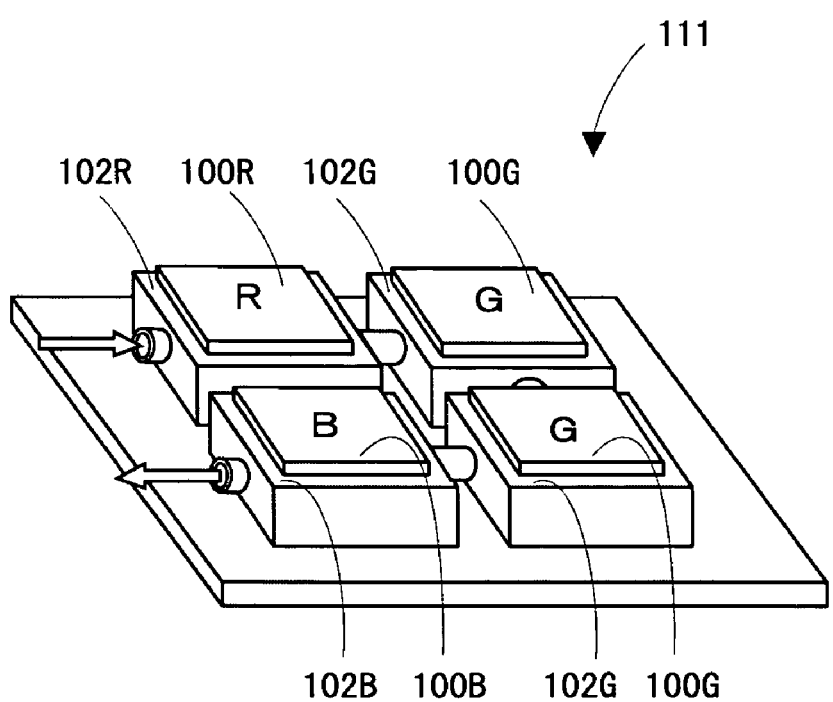
FIG. 6 is a view showing the fourth embodiment of the present invention, and is a perspective view showing the white light illuminating device.

FIG. 6 is a perspective view showing a white light illuminating device 111 used in the projection type video display apparatus. This white light illuminating device 111 is also formed such that a plurality of light sources are arranged in the same one plane surface. The heat conductive portion 102R for the LED light source 100R, the heat conductive portions 102G, 102G for the LED light source 100G, and the heat conductive portion 102B for the LED light source 100B are arranged such that a line connecting centers thereof forms a square shape, and the LED light source 100 is arranged on each heat conductive portion respectively.

The heat conductive portions 102 are connected by the pipe one another, and the cooling liquid cooled by passing through the radiation fin 14 not shown passes through the heat conductive portion 102R, then passes through the heat conductive portions 102G, 102G, and after that, passes through the heat conductive portion 102B.

Degrees of deterioration by heat in the respective LED light sources 100 are different, and the degree of deterioration by heat is the greatest in the LED light source 100R for emitting light in red. The cooling liquid firstly passes through the heat conductive portion 102R. That is, the cooling liquid in the lowest-temperature state is supplied to the LED 100R of which degree of the deterioration by heat is the greatest, so that the temperature rise in the LED light source 100R is restrained and the deterioration by heat is prevented. It is noted that, in this embodiment, the cooling liquid which has passed through the heat conductive portion 102R passes through the heat conductive portions 102G, 102C, and passes through the heat conductive portion 102B lastly. It is preferable that the cooling liquid is sequentially circulated through each of the heat conductive portions according to a descending order of the degree of deterioration by heat in the light sources.

In addition, in the configurations shown in FIG. 5 and FIG. 6, it may be configured that the heat generation amounts of the plurality of the light sources are different, and the cooling liquid cooled by passing through the radiation fin is firstly supplied to the heat conductive portion for the light source of which heat generation amount is the smallest. Furthermore, the cooling liquid cooled by passing through the radiation fin may be sequentially circulated through each of the heat conductive portions according to an ascending order of the heat generation amount of the light sources.

Fifth Embodiment

Figure 7:
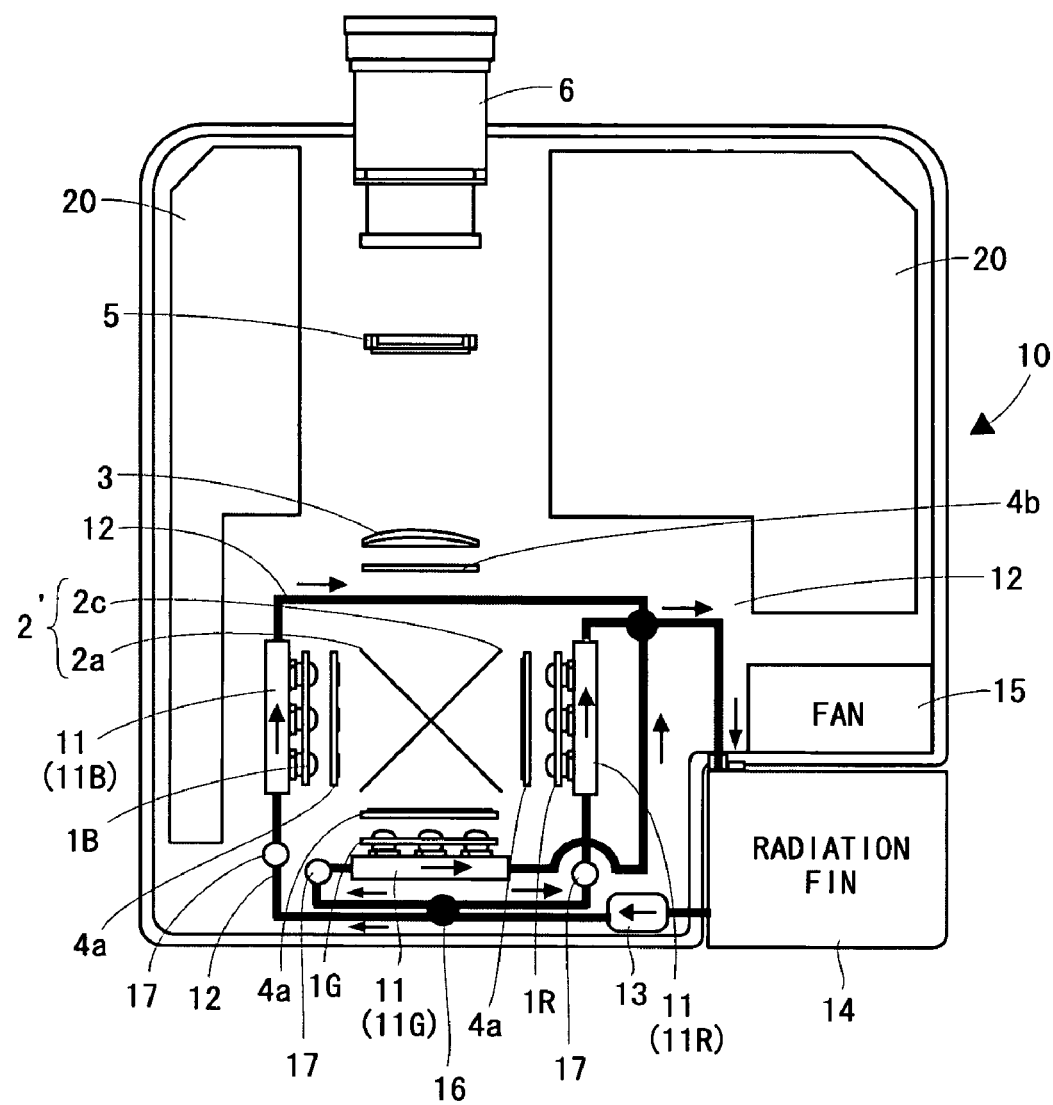
FIG. 7 is a plan view showing a projection type video display apparatus of a fifth embodiment of the present invention.

The fifth embodiment of the present invention will be described with reference to FIG. 7. It is noted that the same numerals are added to the same members as those shown in FIG. 1 and FIG. 3, and descriptions thereof are omitted. In the configuration of FIG. 1, the cooling liquid is sequentially guided to the three heat conductive portions 11. On the other hand, in the configuration shown in FIG. 7, the cooling liquid is guided to the three heat conductive portions 11 in parallel.

The cooling liquid discharged from a pump 13 is guided to a branch 16 at first, and then guided in parallel to each heat conductive portion 11 by each pipe 12 connected to the branch 16. A flow volume regulating valve 17 is provided with each of the pipe 12. A flow volume of the cooling liquid to each of the heat conductive portion 11 can be regulated by operating each flow volume regulating valve 17.

The heat generation amounts of the LED light sources 1R, 1G, 1B are different one another. The cooling liquid cooled by passing through the radiation fin 14 may be supplied most to the heat conductive portion 11 (the heat conductive portion 11G, for example) for the light source of which heat generation amount is the largest. That is, each of the flow regulating valves is set as such. Furthermore, the cooling liquid cooled by passing through the radiation fin 14 may be supplied more to the heat conductive portion 11 for the light source of which heat generation amount is higher (in an order of the heat conductive portion 11G the heat conductive portion 11B, and the heat conductive portion 11R, for example).

The degrees of deterioration by heat in the LED light sources 1R, 1G, and 1B are different from one another. The cooling liquid cooled by passing through the radiation fin 14 may be supplied most to the heat conductive portion 11 (the heat conductive portion 11R, for example) for the light source of which degree of deterioration by heat is the greatest. That is, each of the flow volume regulating valves 17 is set as such. Furthermore, the cooling liquid cooled by passing through the radiation fin 14 may be supplied more to the heat conductive portion 11 for the light source of which degree of deterioration by heat is greater (in an order of the heat conductive portion 11R, the heat conductive portion 11B, and the heat conductive portion 11, for example).

The flow volume of the cooling liquid to each of the heat conductive portion 11 can be regulated by connecting pipes each of which has different thickness (diameter) to each of the heat conductive portion 11. It is noted that the flow volume is fixedly set in this case. Furthermore, in the configuration in which a plurality of LED light sources are arranged on the same one plane surface (see FIG. 5 and FIG. 6), it is possible to adopt a configuration in which each of the heat conductive portions are connected with one another in parallel. Furthermore, the flow volume to each heat conductive portion can be rendered different.

It is preferable to regulate the flow volume of the cooling liquid to each heat conductive portion 11 while taking the following matters into consideration. For example, let a targeted maintaining temperature of the LED light source 1R be 35° C. It is assumed that an air temperature where the projection type video display apparatus is normally used is 25° C., and the flow volume (prescribed flow volume) supposed to be supplied to the heat conductive portion 11R is calculated based on the heat generation amount of the LED light source 1R per unit time period and a degree of heat conductivity of the heat conductive portion 11R, and the like. Similarly, the prescribed flow volume to the heat conductive portion 11G, the prescribed flow volume to heat conductive portion 11B are calculated respectively. The prescribed flow volumes calculated in this manner are sometimes different one another. Each flow volume regulating valve 17 is adjusted depending on this difference. Needless to say, there is a possibility that the targeted maintaining temperatures of the respective LED light sources are rendered different. If the LED light source 1R is the light source of which degree of deterioration by heat is great, a value, which is the prescribed flow volume calculated as described above plus something extra, can be the prescribed flow volume. Alternatively, if deterioration begins when the temperature of the LED light source 1R exceeds 30° C., it is possible to adopt a concept that the targeted maintaining temperature of the LED light source 1R is set at 30° C. That is, it can be considered that, when the degree of deterioration by heat is great in each LED light source, the targeted maintaining temperature of each LED light source is low.

It is noted that a temperature sensor for detecting the temperature inside the case in the projection type video display apparatus, the temperature in the vicinity of the LED light sources, the temperature of a cooling medium returning to the radiation fin 14, or the temperature of the cooling medium going out from the radiation fin 14, may be provided, and a discharge amount of the pump 13 can be controlled according to the temperature indicated by this temperature sensor. This discharge amount control can be applied to above-described first to fourth embodiments, which are a series-type configuration (a plurality of heat conductive portions are connected in series).

Sixth Embodiment

Figure 8:
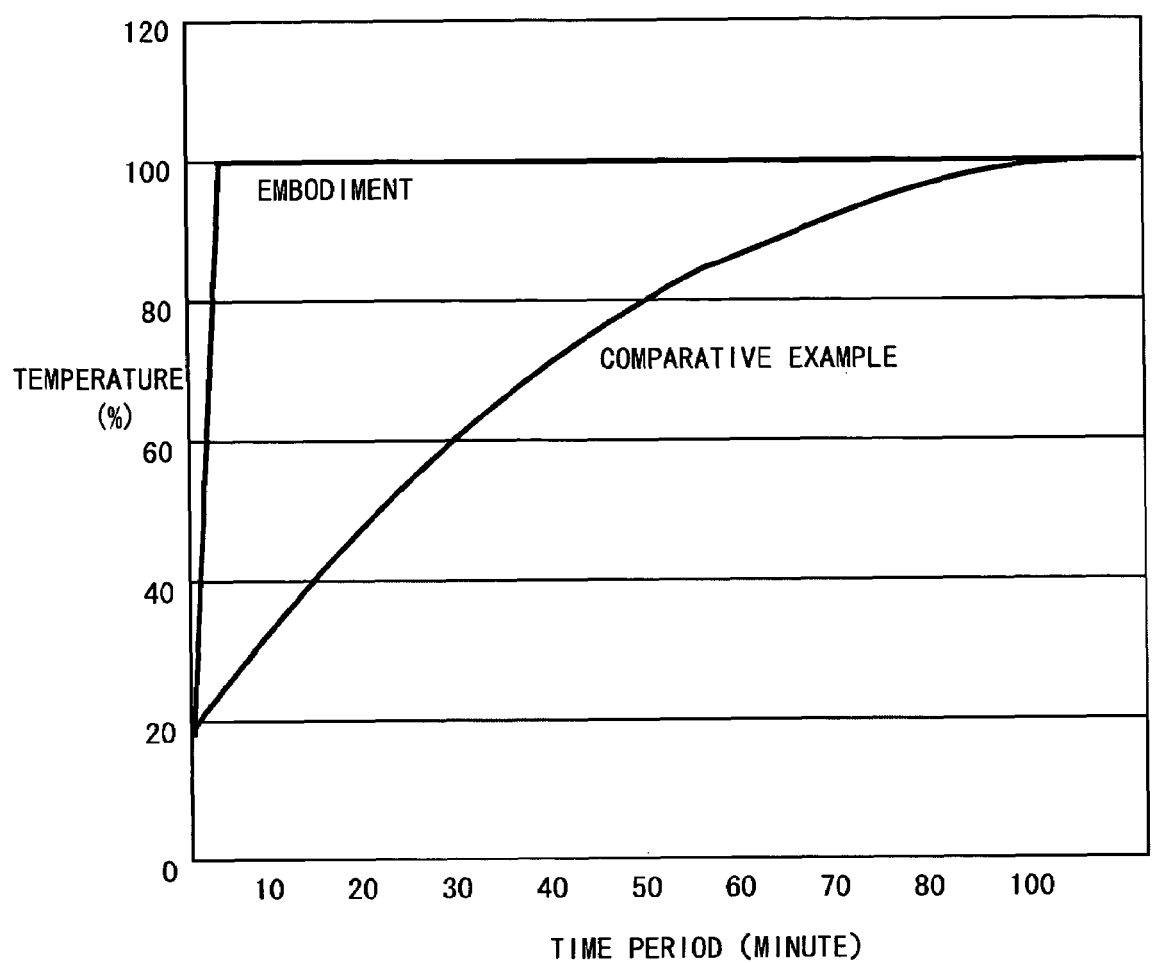
FIG. 8 is a graph showing a control content in a projection type video display apparatus of a sixth embodiment of the present invention.

The sixth embodiment of the present invention is described with reference to FIG. 8. FIG. 8 is a graph showing a relationship between a lapse of time period after the power source was turned on (minute) and a temperature change. The temperature change shows the present temperature by a percentage with assuming that the targeted maintaining temperature (a temperature range in which a stable light-emitting quality in the light source can be obtained) is 100.

A comparative example in FIG. 8 shows the temperature change of the LED light source 1 when the pump 13 is normally operated simultaneously at the time that the power source of the projection type video display apparatus is turned on. As shown in the comparative example, in a case where the pump 13 is normally operated simultaneously at the time that the power source of the projection type video display apparatus is turned on, it takes a relatively long time until the temperature of the LED light source 1 reaches the targeted maintaining temperature. As a result, image quality of a projected image is not stable.

In the sixth embodiment, there are provided a temperature sensor for detecting the temperature of the LED light source and a controller (microcomputer) for controlling the pump 13 based on an output of the temperature sensor. Then, in a case where the temperature detected by the temperature sensor is equal to or higher than a certain temperature (the above-described targeted maintaining temperature or a temperature a little lower than the targeted maintaining temperature, for example), supply of the cooling liquid in the prescribed flow volume is started (the pump 13 is normally operated.) It is assumed that the present air temperature is 25° C., the temperature of the LED light source of the projection type video display apparatus is also 25° C., and the certain temperature is 35° C. Even if the power source of the projection type video display apparatus is turned on under such a condition, the supply of cooling liquid in the prescribed flow volume is not started. That is, the supply amount of the cooling liquid is 0 (zero) or less than the prescribed flow volume (the pump 13 is operated with low electric power). In the embodiment of FIG. 8, the supply amount of the cooling liquid is 0 (zero) (a state where the operation of the pump 13 is suspended). As shown in the graph of the embodiment of FIG. 8, the temperature of the LED light source 1 reaches the certain temperature (35° C.) immediately after the power source of the projection type video display apparatus was turned on, the supply of the cooling liquid in the prescribed flow volume is started (a state where the operation of pump 13 is suspended), and the temperature of the LED light source 1 is maintained at the targeted temperature. It is noted that, in a case where the power source of the projection type video display apparatus is turned on again a little after the power source was turned off, the temperature of the LED light source 1 is almost at the certain temperature (35° C.), so that the supply of the cooling liquid in the prescribed flow volume is started almost immediately (a state where the operation of the pump 13 is suspended).

In a configuration in which one light source is provided, such the control is performed by detecting the temperature of the light source. In a configuration in which a plurality of light sources are provided, one or a plurality of temperature sensors for detecting temperature of one or several light sources out of the plurality of the light sources, and the supply of the cooling liquid in the prescribed flow volume may be started in a case where one or all of the several temperatures detected by the one or the plurality of the temperature sensors are equal to or higher than the certain temperature. Alternatively, a temperature sensor for detecting the temperature of the light source of which degree of deterioration by heat is the greatest out of the plurality of the light sources is provided, and the supply of the cooling liquid in the prescribed flow volume is started in a case where the temperature detected by the temperature sensor is equal to or higher than the certain temperature.

In the above-described parallel type (a type in which a plurality of heat conductive portions are connected with each other in parallel: see the fifth embodiment), the control shown in the sixth embodiment is performed individually on each LED light sources. It is assumed that the targeted maintaining temperature of the LED light source 1R is 30° C., the targeted maintaining temperature of the LED light source 1G is 32° C., and the targeted maintaining temperature of the LED light source 1B is 34° C., for example. Three temperature sensors are provided to detect the temperature of each of the three LED light sources 1. Furthermore, instead of the flow volume regulating valve 17 shown in FIG. 7, a valve (a valve using an electromagnetic solenoid, etc.) which is turned on and off by an electronic control is provided. A controller (microcomputer) not shown inputs temperature information from each temperature sensor. If the present air temperature is 25° C. in a state where the power source of the projection type video display apparatus is turned off, the temperature information from each temperature sensor indicates 25° C., and the controller performs a control for rendering all the valves OFF (close) in this state. When the power source of the projection type video display apparatus is turned on, an energization to each LED light source 1 is performed simultaneously, and the temperature of each LED light source 1 rises. At the time point that the temperature of each LED light source 1 reaches the certain temperature (at the time point that the temperature of each LED light source reaches the targeted maintaining temperature, or at the time point that the temperature of each LED light sources reaches the temperature a littler lower than the targeted maintaining temperature) respectively, each valve is ON (opened), and cooling of each LED light source 1 is started.

It is noted that the discharge amount of the pump 13 may be controlled stepwisely. Electric power to be applied is controlled by the controller such that the discharge amount becomes a first discharge amount when one of the three valves is opened, the electric power to be applied is controlled by the controller such that the discharge amount becomes a second discharge amount when two valves are opened, and the electric power to be applied is controlled by the controller such that the discharge amount becomes a third discharge amount when the three valves are opened, for example. Moreover, in a case where the flow volume regulating valve 17 is formed of an electrically operated valve with a motor, such the flow volume regulating valve 17 may be used. Furthermore, when such the flow volume regulating valve 17 is used, the cooling liquid can be supplied in a flow volume less than the prescribed flow volume in a state where the temperature has not reached the targeted maintaining temperature.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projection type video display apparatus comprising:
   a plurality of light sources;
   a plurality of heat conductive portions for conducting heat generated by each light source to cooling liquid, the heat conductive portions being provided in the vicinity of each of the light sources;
   a pipe for circulating the cooling liquid through the heat conductive portions;
   a pump connected to the pipe;
   a radiation portion connected to the pipe, the radiation portion being provided in an outside area partitioned off from an arrangement space of the light sources; and
   a wind generator for generating wind to cool the radiation portion.

2. A projection type video display apparatus according to claim 1, wherein the wind generator draws in an air inside the apparatus and exhausts the air to the outside area.

3. A projection type video display apparatus according to claim 1, wherein at least one of the pipe and the heat conductive portion is covered with a heat-insulating material.

4. A projection type video display apparatus according to claim 1, wherein the light sources are composed of a solid light-emitting element.

5. A projection type video display apparatus according to claim 1, wherein the cooling liquid is sequentially circulated through the plurality of the heat conductive portions.

6. A projection type video display apparatus according to claim 5, wherein the plurality of the light sources are arranged in a same one plane surface.

7. A projection type video display apparatus according to claim 5, wherein heat generation amounts of the plurality of the light sources are different, and the cooling liquid cooled by passing through the radiation portion is firstly supplied to the heat conductive portion for the light source of which heat generation amount is the smallest.

8. A projection type video display apparatus according to claim 7, wherein the cooling liquid cooled by passing through the radiation portion is sequentially circulated through each of the heat conductive portions according to an ascending order of the heat generation amount of the light sources.

9. A projection type video display apparatus according to claim 8, wherein the plurality of the light sources are a red light source for emitting light in red, a green light source for emitting light in green, and a blue light source for emitting light in blue, and the cooling liquid cooled by passing through the radiation portion is firstly supplied to the heat conductive portion for the red light source, secondly supplied to the heat conductive portion for the blue light source, and lastly supplied to the heat conductive portion for the green light source.

10. A projection type video display apparatus according to claim 7, wherein the plurality of the light sources are a red light source for emitting light in red, a green light source for emitting light in green, and a blue light source for emitting light in blue, and the cooling liquid cooled by passing through the radiation portion is firstly supplied to the heat conductive portion for the red light source.

11. A projection type video display apparatus according to claim 7, wherein the heat conductive portion to receive the cooling liquid lastly is positioned in the vicinity of the radiation portion.

12. A projection type video display apparatus according to claim 5, wherein degrees of deterioration by heat are different in the plurality of the light sources, and the cooling liquid cooled by passing through the radiation portion is firstly supplied to the heat conductive portion for the light source of which degree of deterioration by heat is the greatest.

13. A projection type video display apparatus according to claim 12, wherein the cooling liquid cooled by passing through the radiation portion is circulated through each of the heat conductive portions according to a descending order of the deterioration by heat in the light sources.

14. A projection type video display apparatus according to claim 13, wherein the plurality of the light sources are a red light source for emitting light in red, a green light source for emitting light in green, and a blue light source for emitting light in blue, and the cooling liquid cooled by passing through the radiation portion is firstly supplied to the heat conductive portion for the red light source, secondly supplied to the heat conductive portion for the green light source, and lastly supplied to the heat conductive portion for the blue light source.

15. A projection type video display apparatus according to claim 13, wherein the heat conductive portion to receive the cooling liquid lastly is positioned in the vicinity of the radiation portion.

16. A projection type video display apparatus according to claim 13, wherein the heat conductive portion to receive the cooling liquid firstly is positioned in the vicinity of the radiation portion.

17. A projection type video display apparatus according to claim 12, wherein the plurality of the light sources are a red light source for emitting light in red, a green light source for emitting light in green, and a blue light source for emitting light in blue, and the cooling liquid cooled by passing through the radiation portion is firstly supplied to the heat conductive portion for the red light source.

18. A projection type video display apparatus according to claim 12, comprising a temperature sensor for detecting a temperature of the light source of which degree of deterioration by heat is the greatest out of the plurality of the light sources, wherein, in a case where the temperature detected by the temperature sensor is equal to or higher than a certain temperature, supply of the cooling liquid in a prescribed flow volume is started.

19. A projection type video display apparatus according to claim 5, comprising one or a plurality of temperature sensors for detecting a temperature of one or several light sources out of the plurality of the light sources, wherein, in a case where one or all of the several temperatures detected by the one or the plurality of temperature sensors are equal to or higher than a certain temperature, supply of the cooling liquid in a prescribed flow volume is started.

20. A projection type video display apparatus according to claim 1, wherein the plurality of the light sources are arranged in an approximate U-shape.

21. A projection type video display apparatus according to claim 1, comprising a temperature sensor for detecting a temperature of the light source, wherein, in a case where the temperature detected by the temperature sensor is equal to or higher than a certain temperature, supply of the cooling liquid in a prescribed flow volume is started.

22. A projection type video display according to claim 1, comprising a plurality of the light sources and the heat conductive portion in each of the light sources, wherein the cooling liquid is circulated through a plurality of the heat conductive portions in parallel.

23. A projection type video display according to claim 22, wherein the plurality of the light sources are arranged in an approximate U-shape.

24. A projection type video display apparatus according to claim 22, wherein the plurality of the light sources are arranged in a same one plane surface.

25. A projection type video display apparatus according to claim 22, wherein heat generation amounts of the plurality of the light sources are different, and the cooling liquid cooled by passing through the radiation portion is supplied most to the heat conductive portion for the light source of which heat generation amount is the largest.

26. A projection type video display apparatus according to claim 25, wherein the cooling liquid cooled by passing through the radiation portion is supplied more to the heat conductive portion for the light source of which heat generation amount is larger.

27. A projection type video display apparatus according to claim 26, wherein the plurality of the light sources are a red light source for emitting light in red, a green light source for emitting light in green, and a blue light source for emitting light in blue, and a supply amount of the cooling liquid cooled by passing through the radiation portion is in a descending order of the heat conductive portion for the green light source, the heat conductive portion for the blue light source, and the heat conductive portion for the red light source.

28. A projection type video display apparatus according to claim 25, wherein the plurality of the light sources are a red light source for emitting light in red, a green light source for emitting light in green, and a blue light source for emitting light in blue, and the cooling liquid cooled by passing through the radiation portion is supplied most to the heat conductive portion for the green light source.

29. A projection type video display apparatus according to claim 22, wherein degrees of deterioration by heat are different in the plurality of the light sources, and the cooling liquid cooled by passing through the radiation portion is supplied most to the heat conductive portion for the light source of which degree of deterioration by heat is the greatest.

30. A projection type video display apparatus according to claim 29, wherein the cooling liquid cooled by passing through the radiation portion is supplied more to the heat conductive portion for the light source of which degree of deterioration by heat is greater.

31. A projection type video display apparatus according to claim 30, wherein the plurality of the light sources are a red light source for emitting light in red, a green light source for emitting light in green, and a blue light source for emitting light in blue, and a supply amount of the cooling liquid cooled by passing through the radiation portion is in a descending order of the heat conductive portion for the red light source, the heat conductive portion for the blue light source, and the heat conductive portion for the green light source.

32. A projection type video display apparatus according to claim 29, wherein the plurality of the light sources are a red light source for emitting light in red, a green light source for emitting light in green, and a blue light source for emitting light in blue, and the cooling liquid cooled by passing through the radiation portion is supplied most to the heat conductive portion for the red light source.

33. A projection type video display apparatus according to claim 22, comprising one or a plurality of temperature sensors for detecting a temperature of one or several light sources out of the plurality of the light sources, wherein, in a case where one or all of the several temperatures detected by the one or the plurality of temperature sensors are equal to or higher than a certain temperature, supply of the cooling liquid in a prescribed flow volume is started.

34. A projection type video display apparatus according to claim 22, comprising: a temperature sensor for detecting a temperature of each light source; wherein, in a case where the temperature of each light source detected by the temperature sensor is equal to or higher than a certain temperature, supply of the cooling liquid to each light source in a prescribed flow volume is started individually.

35. A projection type video display apparatus according to claim 1, including a heat conductive portion for a member, the heat conductive portion for a member conducting to the cooling liquid heat generated by the member which generates heat by energization thereto, wherein the pipe is connected also to the heat conductive portion for the member.

36. A projection type video display apparatus according to claim 1, including a heat conductive portion for an optical part, the heat conductive portion for an optical part conducting to the cooling liquid heat generated by the optical part which generates heat by receiving light emitted from the light source, wherein the pipe is connected also to the heat conductive portion for an optical part.

37. A projection type video display apparatus comprising:
a plurality of light sources;
a plurality of heat conductive portions for conducting heat generated by each light source to cooling liquid, the heat conductive portions being provided in the vicinity of each of the light sources;
a pipe for circulating the cooling liquid through the heat conductive portion;
a pump connected to the pipe;
a radiation portion connected to the pipe, the radiation portion being provided in an outside area partitioned off by a case of the apparatus from an arrangement space of the light sources; and
a wind generator for generating wind to cool the radiation portion, the wind generator being provided in the case of the apparatus,
wherein the wind generator and the radiation portion are arranged to face each other through a wall of the case.

* * * * *

UNITED STATES PATENT AND TRADEMARK OFFICE
CERTIFICATE OF CORRECTION

PATENT NO. : 7,578,595 B2  Page 1 of 1
APPLICATION NO. : 11/248607
DATED : August 25, 2009
INVENTOR(S) : Miwa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 151 days.

Signed and Sealed this

Seventh Day of September, 2010

David J. Kappos
*Director of the United States Patent and Trademark Office*